United States Patent
Sherwin, Jr. et al.

(10) Patent No.: US 7,383,460 B2
(45) Date of Patent: Jun. 3, 2008

(54) METHOD AND SYSTEM FOR CONFIGURING A TIMER

(75) Inventors: Bruce J Sherwin, Jr., Woodinville, WA (US); Eric Nelson, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 392 days.

(21) Appl. No.: 11/089,957

(22) Filed: Mar. 25, 2005

(65) Prior Publication Data

US 2006/0218429 A1   Sep. 28, 2006

(51) Int. Cl.
*G06F 1/04* (2006.01)
*G06F 1/12* (2006.01)
*G06F 5/06* (2006.01)
*G06F 11/00* (2006.01)
*G06F 3/00* (2006.01)
*G06F 9/44* (2006.01)
*G06F 9/46* (2006.01)
*G06F 13/00* (2006.01)

(52) U.S. Cl. .................. 713/600; 714/55; 719/328
(58) Field of Classification Search ............ 713/600; 714/55; 719/328
See application file for complete search history.

(56) References Cited

U.S. PATENT DOCUMENTS

| 5,519,851 A | * | 5/1996 | Bender et al. .............. 710/301 |
| 6,078,747 A | * | 6/2000 | Jewitt ......................... 717/164 |
| 2003/0204792 A1 | * | 10/2003 | Cahill et al. .................. 714/55 |
| 2005/0022166 A1 | * | 1/2005 | Wolff et al. ................. 717/124 |

* cited by examiner

*Primary Examiner*—Chun Cao
*Assistant Examiner*—Jaweed A Abbaszadeh
(74) *Attorney, Agent, or Firm*—Christensen O'Connor Johnson Kindness PLLC

(57) ABSTRACT

The present invention facilitates access to timers in a computing device. In particular, a timer system facilitates configuring a hardware interrupt timer in a computing device, the timer being guaranteed to expire at a specific time in a non-real-time environment. A calling application passes parameters to a hardware independent application programming interface (API) to the hardware interrupt timer. The hardware independent API validates the parameters and relays them to a hardware dependent API. The hardware dependent API establishes a connection with the timer in accordance with the validated parameters, and executes a service routine associated with the application upon expiration of the timer.

15 Claims, 7 Drawing Sheets

METHOD AND SYSTEM FOR CONFIGURING A TIMER

TECHNICAL FIELD

In general, the present invention relates to timers in a computing device and, more particularly, to configuring timers in a computing device.

BACKGROUND

Operating systems, such as Microsoft's Windows NT, typically provide the ability to program a timer. However, such timers are not guaranteed to expire at a programmed time; rather, they are only guaranteed to not expire before the programmed time. The lack of specificity of the time at which the timer expires makes the timer unsuitable for many applications. For example, certain test scenarios, performance and/or power consumption algorithms require a timer that is guaranteed to expire at a certain time, even when used in a non-real-time environment, such as the environment provided by Windows NT.

Timers that are guaranteed to expire at a certain time are typically hardware timers. For example, personal computer hardware provided by Intel Corporation supports a minimum of three such hardware timers, referred to as High Precision Event Timers ("HPET").

In Windows NT, access to computer hardware is controlled by the Windows NT hardware abstraction layer ("HAL"). Among the advantages of a HAL is that a single device driver can use standard HAL routines to support a device on many different hardware platforms, making device driver development much easier, and allowing different hardware configurations accessible in a similar manner. However, because the HAL operates at a level between the hardware and the Windows NT executive services, a disadvantage of the HAL is that applications and device drivers are unaware of hardware-dependent details, such as I/O interfaces and interrupt controllers, including the HPET timers. Applications and device drivers are no longer allowed to deal with hardware directly and must make calls to HAL routines to determine hardware-specific information. As a result, access to HPET timers that have the necessary specificity (i.e., access to timers that are guaranteed to expire at a certain time) for use in certain test scenarios, performance and/or power consumption algorithms is either not permitted, or is difficult at best.

SUMMARY

The foregoing problems with the prior state of the art are overcome by the principles of the present invention, which is directed toward methods, systems, computer program products, and data structures for facilitating access to timers in a computing device. The present invention is further directed toward methods, systems, computer program products, and data structures for configuring a timer in a computing device, the timer being guaranteed to expire at a specific time in a non-real-time environment.

According to one aspect of the invention, a method is provided for configuring timer hardware that is guaranteed to expire at a specified time in a non-real time environment. Upon expiration, the method may return control to the calling application in the non-real-time environment, including providing a generic software callback to the calling application. Upon expiration, the method may further initiate the timer's interrupt service routine (ISR), which may be optionally modified to initiate an application ISR specified by the calling application.

According to another aspect of the invention, configuring timer hardware that is guaranteed to expire at a specified time may include configuring timer hardware to expire in an aperiodic or periodic mode. When configuring timer hardware to expire in the aperiodic mode, the timer is guaranteed to expire once at a specified time. In the periodic mode, the timer is guaranteed to expire more than once, at a specified interval. In the periodic mode, the timer may be further guaranteed to expire more than once at a specified interval commencing at a specified time.

According to still another aspect of the invention, the method for configuring timer hardware may include an application programming interface (API) comprising a hardware-independent API and a hardware-dependent API. A timer application may call the hardware-independent API specifying, among other parameters, at least one of an interval, an interrupt request level (IRQL), and an application ISR. Among the functions provided by the hardware-independent API is validation of the specified parameters, verification of the calling application's privileges, and registration or deregistration of the application ISR.

According to yet another aspect of the invention, the hardware-independent API may, in turn, call the hardware-dependent API, passing, among other parameters, the specified time, interval, IRQL, and application ISR. Among the functions provided by the hardware-dependent API is the registration of a timer ISR on an available hardware interrupt, wrapping the application ISR into the timer ISR, setting the timer mode of operation to periodic when an interval is specified, updating the hardware timer's comparator register with the specified time and/or interval, initiating the timer ISR upon expiration of the timer, initiating the application ISR from the timer ISR, and returning control to the calling application.

In accordance with yet other aspects of the present invention, a computer-accessible medium for facilitating access to timers in a computing device is provided, including a medium for storing data structures and computer-executable components for establishing a connection between an application and a hardware timer, specifying and validating parameters for the operation of the hardware timer, initiating the timer on behalf of the application, and returning control to the application when the timer has ended. The data structures define the hardware timer parameters, and other timer data in a manner that is generally consistent with the above-described systems and methods. Likewise, the computer-executable components, including the hardware-independent and hardware-dependent APIs to the hardware timers, are capable of performing actions generally consistent with the above-described systems and methods.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

To successfully run certain types of test routines, device simulators, or other types of application or system software on a computing device, the software must have access to a timer that is guaranteed to expire at a specified time and/or at a specified interval. However, the functionality of a timer that is guaranteed to expire at a specified time and/or specified interval may not always be accessible to the application or system software that needs it. For example, in the Microsoft Windows NT environment, the hardware application layer (HAL) does not permit application and system software to directly access the hardware-specific information needed to use a hardware timer, such as the High Precision Event Timer (HPET) timer that is provided with Intel computer hardware. Unfortunately, hardware timers are generally the only timers that are guaranteed to expire at a specified time. To address this and other problems with accessing timers, a computing system suitable for implementing a method for facilitating access to a timer guaranteed to expire at a specified time or interval in accordance with embodiments of the present invention is described in detail in the following discussion.

As already noted, guaranteed timers are generally hardware timers. Since the specific details of programming a hardware timer may vary from one hardware platform to the next, certain aspects of the method for facilitating access to a timer in accordance with embodiments of the present invention are typically performed in a hardware-independent component, and certain other aspects of the method are typically performed in a hardware-dependent component.

Figure 1:
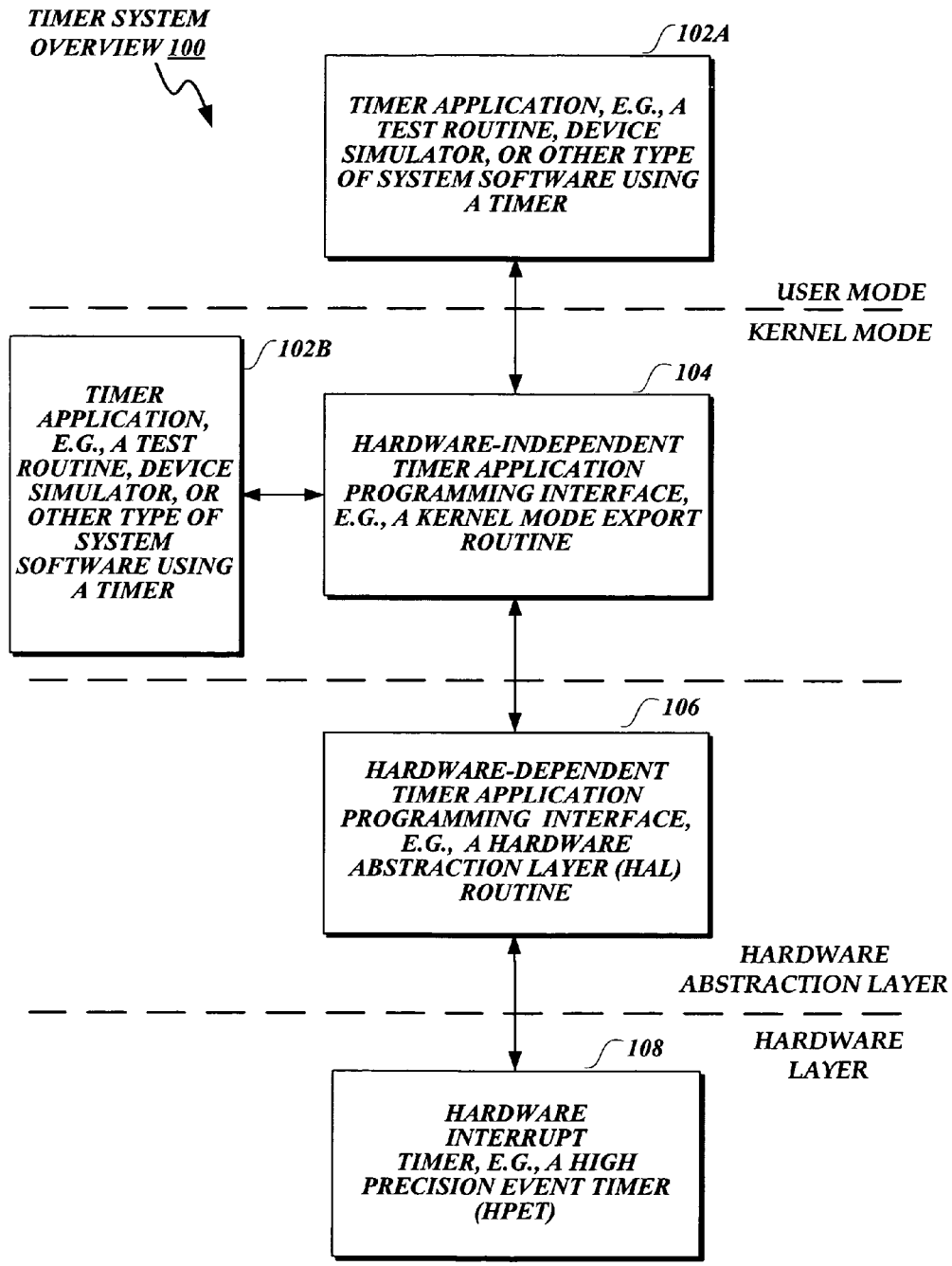
FIG. 1 is a block diagram overview of an exemplary timer system and one suitable operating environment in which access to a timer may be facilitated in accordance with the present invention.

FIG. 1 is a block diagram overview of an exemplary timer system 100 and one suitable operating environment in which access to a timer may be facilitated in accordance with the present invention. As shown, the timer system 100 may include a timer application 102A and/or 102B, residing in either the user mode or the kernel mode, needing access to a timer that can be guaranteed to expire at a specified time and/or at a specified interval. Examples of such timer applications include, but are not limited to, various system timer test routines, device simulators, processor power management testing routines, scheduling algorithms, and kernel performance algorithms.

The timer applications 102A, 102B, establish a connection with a timer 108 that is guaranteed to expire at a specified time and/or a specified interval through a hardware-independent timer application programming interface (API) 104. The hardware-independent API 104 is configured to receive a number of parameters from the timer applications 102A, 102B, such as a pointer to an application interrupt service routine (ISR) that should be initiated upon expiration of the timer, the mode of the timer, i.e., periodic or aperiodic, the interval at which the timer should expire, and so forth.

During operation of the timer 100, a hardware-independent timer API 104 initiates the establishment of a connection between the calling timer application 102A, 102B, and the timer 108 by, among other actions, validating parameters received from the calling timer application, verifying whether the application is authorized to set an interrupt timer using the API 104, and if so, relaying the validated parameters to a hardware-dependent API 106. The hardware-dependent API 106 completes the process of establishing the connection between the calling timer application 102A, 102B, and the hardware timer 108 by, among other actions, setting the hardware timer in accordance with the validated parameters received from the calling timer application.

In one embodiment, in the context of an operating system such as the Microsoft Windows NT operating system, the hardware-independent timer API 104 may be implemented in a kernel mode export driver. A kernel mode export driver may be advantageously used to implement certain hardware-independent aspects of a method for facilitating access to a timer in accordance with an embodiment of the invention. In one embodiment, the kernel mode export driver is a kernel mode dynamic link library (DLL) capable of being loaded by other components of an operating system. The hardware-independent timer API 104 may be implemented in a routine that is part of the hardware abstraction layer, or HAL. A HAL routine has access to the various components of the timer 108 that are necessary to establish a connection with and set the timer according to the validated parameters received from the calling timer application 102A, 102B by way of the hardware-independent API 104.

In one embodiment, the timer 108 may be a high precision event timer (HPET) such as that provided in Intel computer hardware. Establishing a connection with the timer 108 and setting the timer in accordance with an embodiment of the invention will be described in further detail below.

Figure 2:
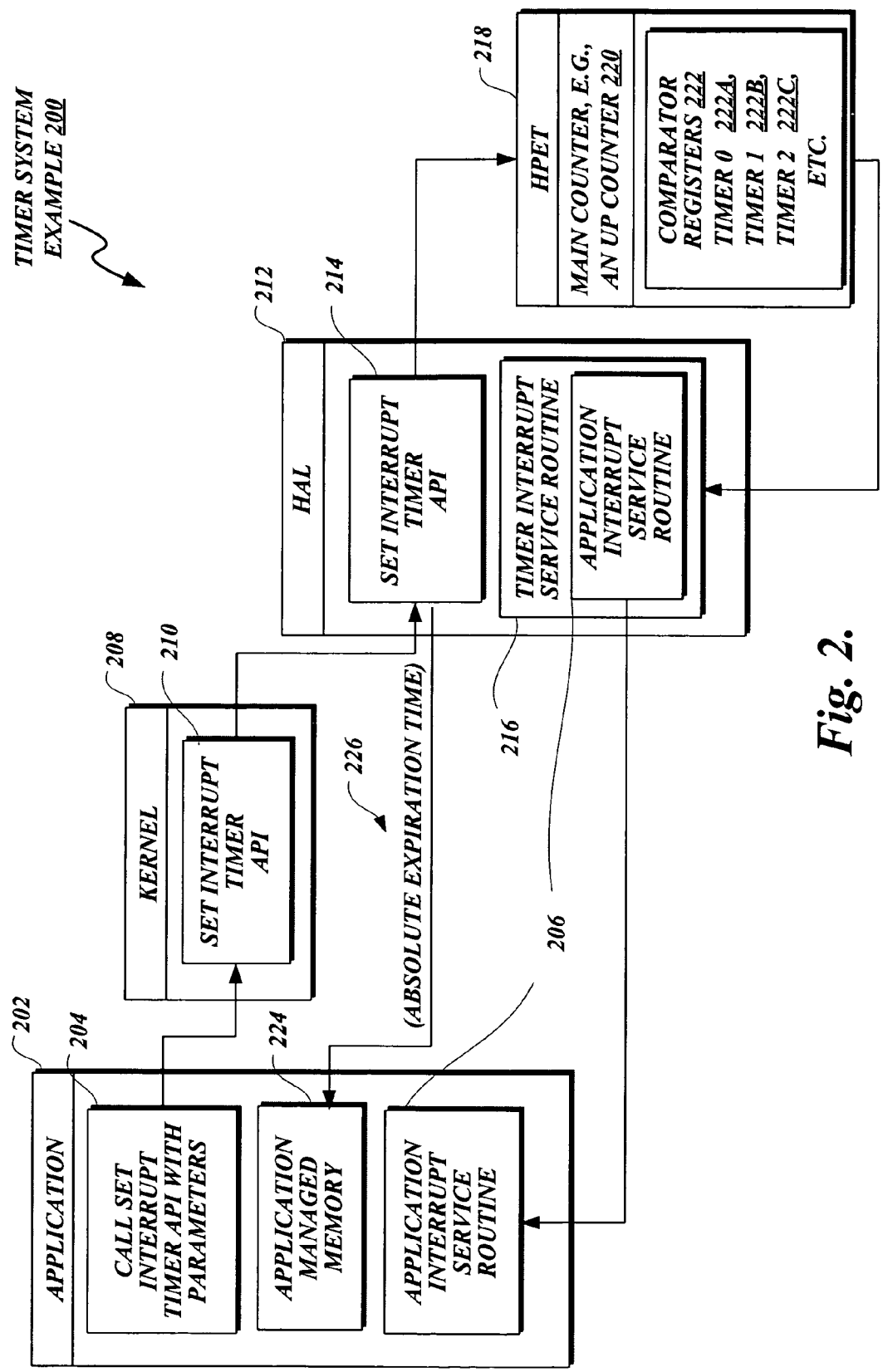
FIG. 2 is a block diagram illustrating in further detail an arrangement of certain components of the timer system illustrated in FIG. 1 for implementing an embodiment of the present invention.

FIG. 2 is a block diagram illustrating in further detail an arrangement of certain components of the timer system illustrated in FIG. 1 for implementing an embodiment of the present invention. A calling application 202 contains a process to call a kernel mode routine 208 having a set interrupt timer API 210 capable of receiving one or more parameters. In one embodiment, the calling application 202 may pass parameters 204 that specify the various timer settings, such as the mode, the interval, the interrupt request level (IRQL) at which the kernel mode routine 208 is to run, and an interrupt service routine (ISR) 206 (or a name or pointer to an application ISR) that should be run upon expiration of the timer with which the calling application 202 ultimately establishes a connection. In one embodiment, the parameters 204 may also include a pointer or other reference to an area of application managed memory 224 in which will be written the actual time that the timer with which the calling application 202 ultimately establishes a connection will expire, also referred to as the absolute expiration time 226.

In one embodiment, the set interrupt timer API 210 validates the parameters 204 and verifies whether the calling application 202 is authorized to set a timer using the API 210. The API 210 then passes the validated parameters to a HAL routine 212, also having a set interrupt timer API 214 corresponding to the API 210.

In one embodiment, the HAL routine 212 includes its own timer interrupt service routine (ISR) 216, or a pointer to a timer ISR, that should be run upon expiration of the timer with which the calling application 102A, 102B, or 202 ultimately establishes a connection. In one embodiment, the timer ISR 216 may be modified to embed the application ISR 206, also referred to as wrapping the application ISR 206 in the timer ISR 216, or otherwise run the application ISR 206 upon the expiration of the timer.

In one embodiment, the HAL set interrupt timer API 214 accesses an available HPET timer 218 and sets the timer by, among other actions, writing an expiration time at which the timer 218 should expire in a corresponding comparator register 222, where the corresponding comparator register includes, for example, comparator registers corresponding to Timer 0, 222A, Timer 1, 222B, or Timer 2, 222C, each located at different offsets in the available HPET timer. In one embodiment, the HAL set interrupt timer API 214 also writes the expiration time at which the timer 218 should expire in an area of application managed memory 224, the location of which may be conveyed to the HAL set interrupt timer API 214 in one of the validated parameters. The operation of the HAL set interrupt timer API 214 will be discussed in further detail with reference to FIG. 3, below.

Once the timer 108 has been set, the connection between the calling application 102A, 102B, or 202 and the timer 108, or 218 is established. The general behavior of the timer 108 is to generate an interrupt at the specified IRQL when the timer expires in accordance with the mode and interval specified in the parameters. For example, when using an HPET timer 218, the timer expires when the main counter 220 of the timer reaches the value written to the comparator register 222A, 222B, or 222C, where the value written to the comparator register is derived from the mode and interval specified in the parameters passed by the calling application 202. The general behavior and operation of HPET timers are known in the art and are set forth in Intel's *Intel Architecture/Personal Computer (IA/PC) HPET (High Precision Event Timers) Specification, Revision* 1.0a, October 2004. Accordingly, details regarding HPET timers will not be further discussed except as the operation and general behavior of the HPET timer pertains to the described embodiments of the present invention.

Figure 3:
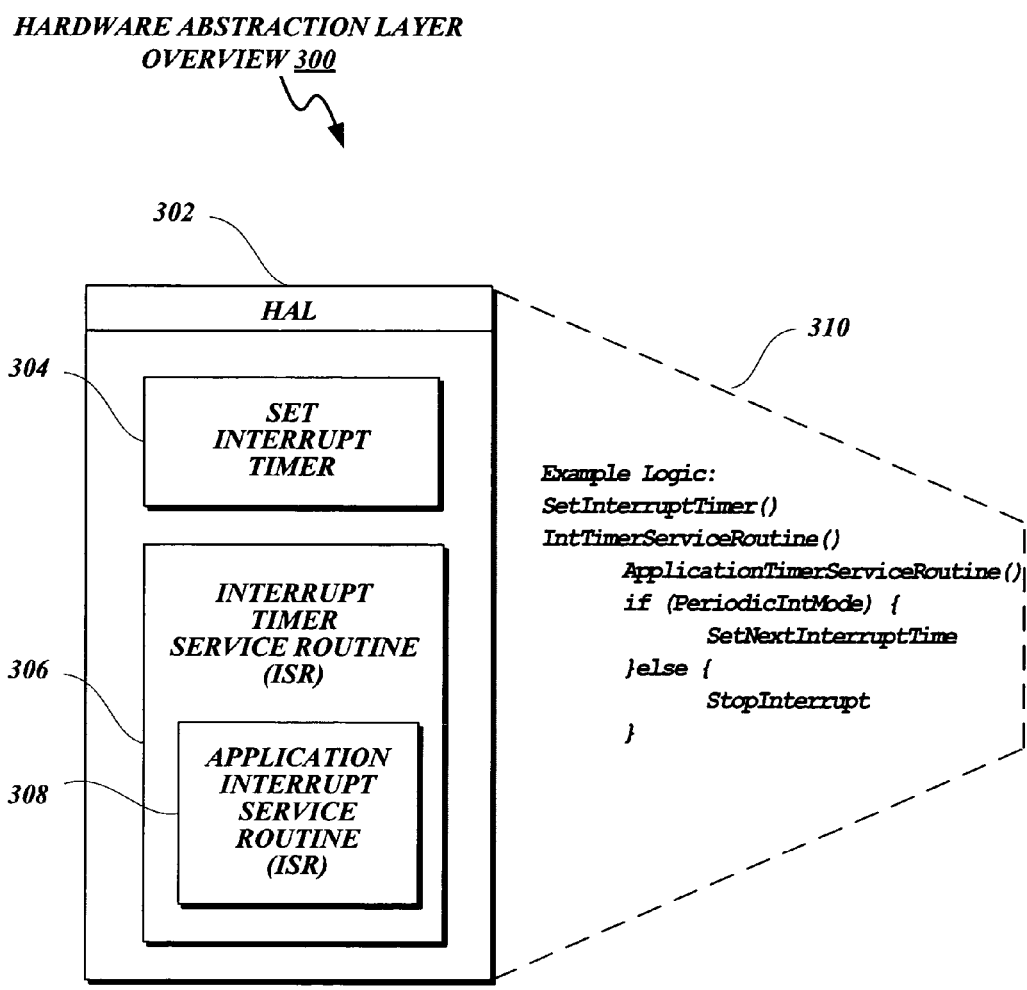
FIG. 3 is a block diagram illustrating in further detail certain aspects of a hardware-dependent interface formed in accordance with an embodiment of the present invention.

FIG. 3 is a block diagram illustrating in further detail a hardware abstraction layer (HAL) overview 300 of a hardware-dependent interface formed in accordance with an embodiment of the present invention. In one embodiment, the hardware-dependent interface to a timer may include a HAL routine 302 corresponding to HAL routine 212 in FIG. 2.

The HAL routine 302 includes a process 304 to initially set a hardware interrupt timer 108 in accordance with the validated parameters received from the calling application 102A, 102B, or 202 (in FIGS. 1, 2). As already noted, when using an HPET timer 218, the set interrupt timer process 304 may include, among other actions, writing an expiration time at which the HPET timer 218 should expire in the corresponding timer's comparator register 222, where the corresponding timer is one of the timers, e.g., Timer 0 222A, Timer 1 222B, or Timer 2, 222C, with which the calling application 202 has established a connection. The process 304 may include other actions to initially set the hardware interrupt timer 108 depending on the particular type of hardware interrupt timer that is being used.

In one embodiment, the expiration time at which the hardware interrupt timer 208 should expire is derived from at least one of the validated parameters received by the HAL routine 302, including the parameters that specified the interval and mode with which to set the interrupt timer using process 304. For example, in a typical embodiment, the expiration time is the current clock time plus the amount of time represented by the interrupt interval specified in the parameters passed by the calling application 102A, 102B.

In one embodiment, the HAL routine 302 also writes the expiration time to an application-managed area of memory 224 (FIG. 2) in the computing device, the pointer to which may optionally be specified in the validated parameters received by the HAL routine 302. Writing the expiration time to this area of memory enables the application to have access to the actual time at which the hardware timer 108 is set to expire, referred to as the absolute expiration time 226 (FIG. 2).

The HAL routine 302 may also include a process to service the interrupts generated by the timer 108, i.e., a timer ISR 306. The timer ISR process 306 contains the logic to set the next expiration time, or to stop the interrupts, depending on the mode specified in the validated parameters received by the HAL routine 302. For example, when the mode is periodic, the derivation and writing of the expiration time is repeated indefinitely, i.e., until the calling application terminates the connection to the timer; otherwise the derivation and writing of the expiration time is carried out once only, i.e., the timer is a one-shot timer.

In one embodiment, the HAL routine 302 may modify the timer ISR 306 to include an additional process to further service the interrupts generated by the timer 108. For example, with reference to FIG. 2, the additional process may be an application ISR 206 that is typically supplied by the calling application 202 as specified in the validated parameters. Depending on the particular embodiment, the calling application 102A, 102B, 202 may supply an application ISR 206 indirectly, by name or by pointer, or directly as executable code.

In an actual embodiment, the HAL routine 302 may be implemented in the example code 310 illustrated in FIG. 3, and set forth below in Table 1.

TABLE 1

HAL Set Interrupt Timer and Service Interrupt Timer Example Logic

```
SetInterruptTimer( )
IntTimerServiceRoutine( )
    ApplicationTimerServiceRoutine( )
    if (PeriodicIntMode) {
        SetNextInterruptTime
    }else {
        StopInterrupt
    }
```

Figure 4:
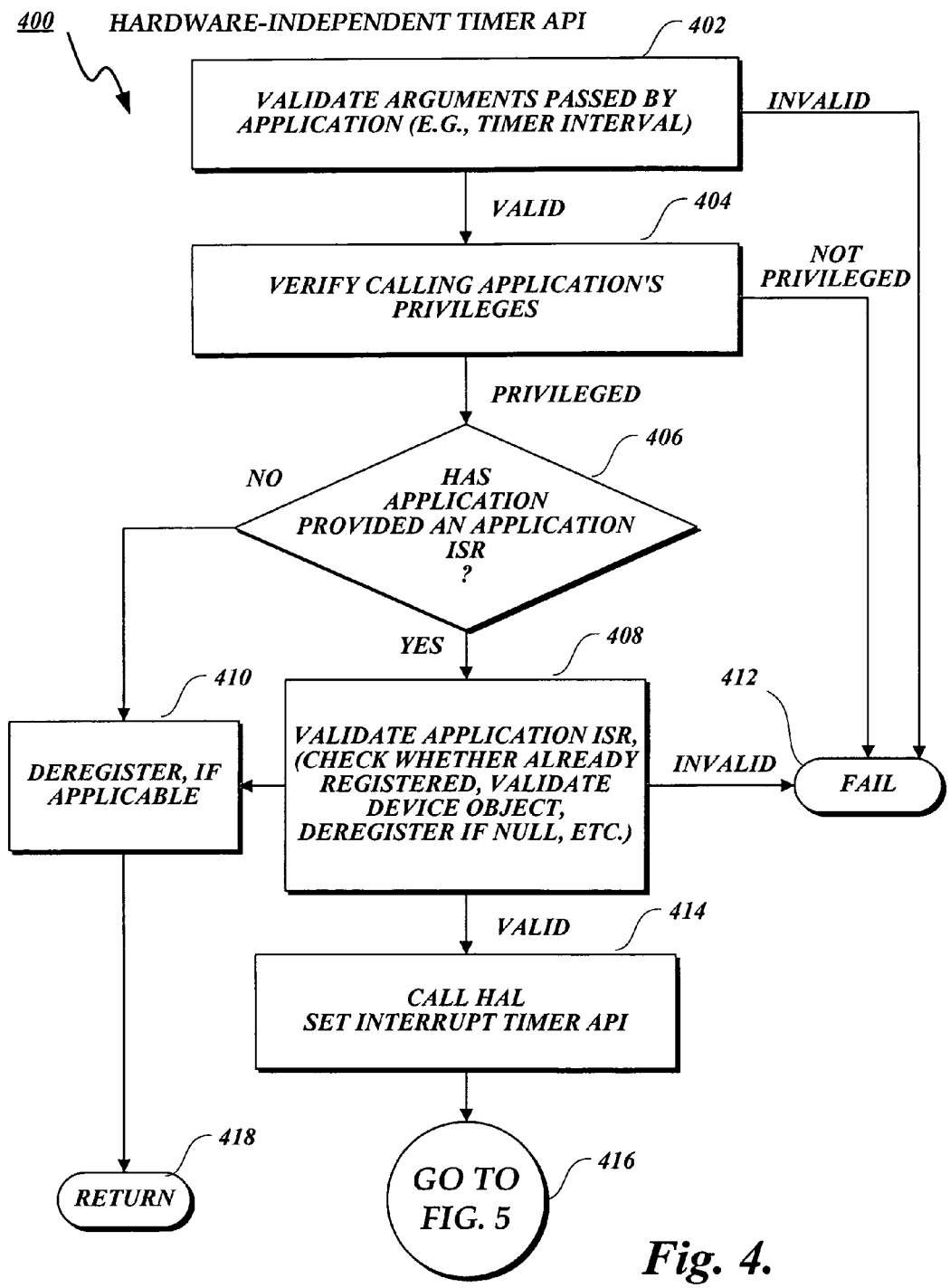
FIG. 4 is a flow diagram illustrating certain aspects of a hardware-independent application programming interface for implementing an embodiment of the present invention.

FIG. 4 is a flow diagram illustrating certain aspects of a hardware-independent timer API 104 (in FIG. 1) for implementing an embodiment of the present invention. In particular, the hardware-independent logic 400 embodied in the hardware-independent timer API 104 will be described with reference to the foregoing descriptions of the various components of a timer system overview 100 referenced in FIG. 1 and the timer system example 200 referenced in FIG. 2, including, among others, the calling application 102A, 102B, 202 and parameters passed by the application, e.g., the parameters 204 and the application ISR 206, the hardware-dependent timer API 106 and example component 212, including the timer API 214 and the timer ISR 216, and the hardware interrupt timer 108 such as the HPET timer 218.

The hardware-independent logic 400 begins at process block 402 with validating the arguments, e.g., parameters 204 passed by the calling timer application 202. In a typical embodiment, validating the parameters includes, among other actions, insuring that the mode has been specified as periodic or aperiodic, making sure that the calling timer application 102A, 102B, 202 has expressed the specified time interval in appropriate system time units, e.g., 100-nanosecond intervals, and that the specified interval is of sufficient duration to use with the available hardware timer 108. For example, when setting an HPET timer 218, as a practical matter, the interval specified in parameters 204 should be sufficiently long enough to allow the derived expiration time to be written to a comparator register 222 before the main counter 220 actually reaches that time. Otherwise, the hardware-dependent timer API 106, e.g., the HAL API 214, will not be able to set the HPET timer 218 properly.

Additional cross-validation of two or more arguments may be performed, such as that described below in blocks 406 and 408 with reference to the application ISR and an associated device object, both of which may also be specified in parameters 204. If any of the parameters 204 are invalid, either alone or in combination, the hardware-independent timer API 104 branches to termination fail process 412 to return to the calling application with an appropriate error message.

The hardware-independent logic 400 continues at process block 404 with verifying the calling application's privileges, i.e., making sure that the calling application 102A, 102B, 202 is operating at a system privilege level that allows access to the various components of the timer 100, such as the APIs 104 and 106, and the hardware interrupt timer 108. If the application If the calling application 102A, 102B, 202 is not authorized, the hardware-independent timer API 104 branches to termination fail process 412 to return to the calling application with an appropriate error message.

The hardware-independent logic 400 continues at decision block 406 to determine whether the calling application 102A, 102B, 202, has provided an application ISR, such as application ISR 206 (FIG. 2). The application ISR 206 may be provided in any number of ways, but is typically provided by passing a pointer to an application ISR 206 in the parameters 204. In one embodiment, when an application ISR 206 has not been provided, the hardware-independent logic 400 may optionally perform a process 410 to deregister any previously specified application ISR 206, after which control is returned at termination block 418 to the calling application 102A, 102B, 202. Otherwise, if an application ISR 206 has been provided, the hardware-independent logic 400 may optionally perform a process 408 to validate the application ISR 206, including cross-validating the application ISR 206 with a device object, also specified in parameters 204. For example, if the pointer to the application ISR 206 is null, and the device object points to the same location used to register the current application ISR 206, the hardware-independent logic 400 may optionally perform a process 410 to deregister the current application ISR. If the device object points to a different location in the calling application's memory than that used to register the current application ISR 206, the application ISR 206 that was provided cannot be validated, and the hardware-independent timer API 104 branches to termination fail process 412 to return to the calling application with an appropriate error message.

The hardware-independent logic 400 continues at process block 414, where the timer system 100 transfers control to the hardware-dependent portion of the 100, i.e., the hardware-dependent API 106, the description of which is referenced in connector circle 416 at FIG. 5 below.

Figure 5:
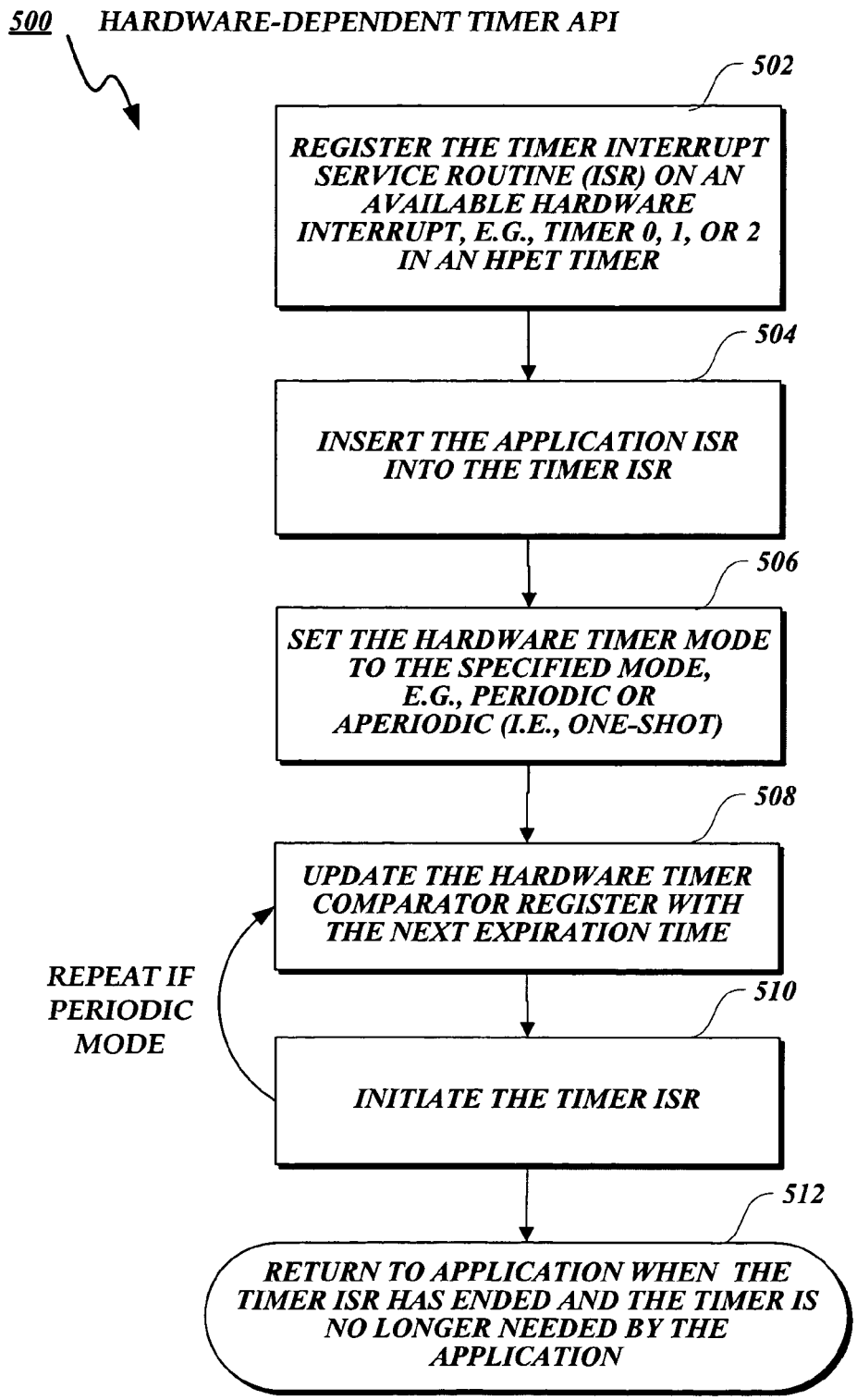
FIG. 5 is a flow diagram illustrating certain aspects of a hardware-dependent application programming interface for implementing an embodiment of the present invention.

FIG. 5 is a flow diagram illustrating certain aspects of a hardware-dependent timer API 106 (in FIG. 1) for implementing an embodiment of the present invention. In particular, the hardware-dependent logic 400 embodied in the hardware-dependent timer API 106 will be described with reference to the foregoing descriptions of the various components of a timer system overview 100 referenced in FIG. 1 and the timer system example 200 referenced in FIG. 2, including, among others, the calling application 102A, 102B, 202 and parameters passed by the application, e.g., the parameters 204 and the application ISR 206, the hardware-dependent timer API 106 and example components 212, including the timer API 214 and the timer ISR 216, and the hardware interrupt timer 108 such as the HPET timer 218.

The hardware-dependent logic 500 begins at process block 502 to register the timer ISR, e.g. the timer ISR 216 contained in HAL routine 212, on an available hardware interrupt, i.e., on one of the timers, Timer 0, 222A, Timer 1, 222B, or Timer 2, 222C in an available HPET timer 218. Registering the timer ISR initiates the connection between the calling application 102A, 102B, and the hardware interrupt timer 108.

In one embodiment, the hardware-dependent logic 500 continues at process block 504 by inserting (also referred to as embedding or wrapping) the application ISR into the timer ISR. For example, as described with reference to FIGS. 2 and 3, the HAL routine 302 (reference 212 in FIG. 2) set interrupt timer process 304 (reference 214 in FIG. 2) inserts the application ISR 308 (reference 206 in FIG. 2) into the timer ISR 306 (reference 216 in FIG. 2).

In one embodiment, the hardware-dependent logic 500 continues at process block 506 by setting the hardware interrupt timer 108 to an aperiodic mode or periodic mode, depending on the mode that was specified in the parameters passed by the calling application 102A, 102B. Setting the timer 108 to the periodic mode will cause the timer to generate an interrupt at regular time intervals, as indicated in the interval specified in the parameters, e.g. parameters 204. Setting the timer 108 to the aperiodic mode will cause the timer 108 to generate just one interrupt, based on the interval specified in the parameters.

In one embodiment, the hardware-dependent logic 500 continues at process block 508 to update the hardware interrupt timer 108 with the actual expiration time. The actual expiration time will be determined by the interval that was specified in the parameters passed by the calling application 102A, 102B. As such, the interval represents a relative time at which the timer 108 will expire, and the actual time depends on the current clock time, also referred to as the current system time of the computing device in which the hardware interrupt timer resides. In a typical embodiment, at process block 508 the specified interval is added to the current system time to obtain the actual expiration time. When the timer system 100 is being implemented in a device using an HPET timer 218, the actual expiration time is written to the comparator register 222 corresponding to the timer, Timer 0, 222A, Timer 1, 222B, or Timer 2, 222C, on which the timer ISR 216 was registered in process block 502. In one embodiment, at process block 508, the actual expiration time may be optionally written to an area of application managed memory, such as memory 224 in FIG. 2, the location of which is determined by a pointer or other information specified in the parameters passed by the calling application 102A, 102B. This enables the calling application 102A, 102B to have access to the actual expiration time of the timer with which a connection has been established.

The hardware-dependent logic 500 continues at process block 510 to initiate the timer ISR (and embedded application ISR, if any), upon expiration of the timer 108. The processes in process blocks 508 and 510 are repeated when the timer is set to periodic mode, incrementing the actual expiration time by the time in the specified interval until, at termination process 512, the application terminates the connection that was established with the timer 108, or the timer otherwise stops operating.

In one embodiment, the appropriate error messages referred to in FIGS. 4 and 5 may include, but are not limited to, an insufficient resources message indicating that another application ISR may have already registered with the API, a hardware timer not supported message indicating that suitable hardware interrupt timers are not present in the computing device, and an invalid parameter message indicating that one or more parameters 204 are invalid, or the combination of parameters is invalid.

Figure 6A:
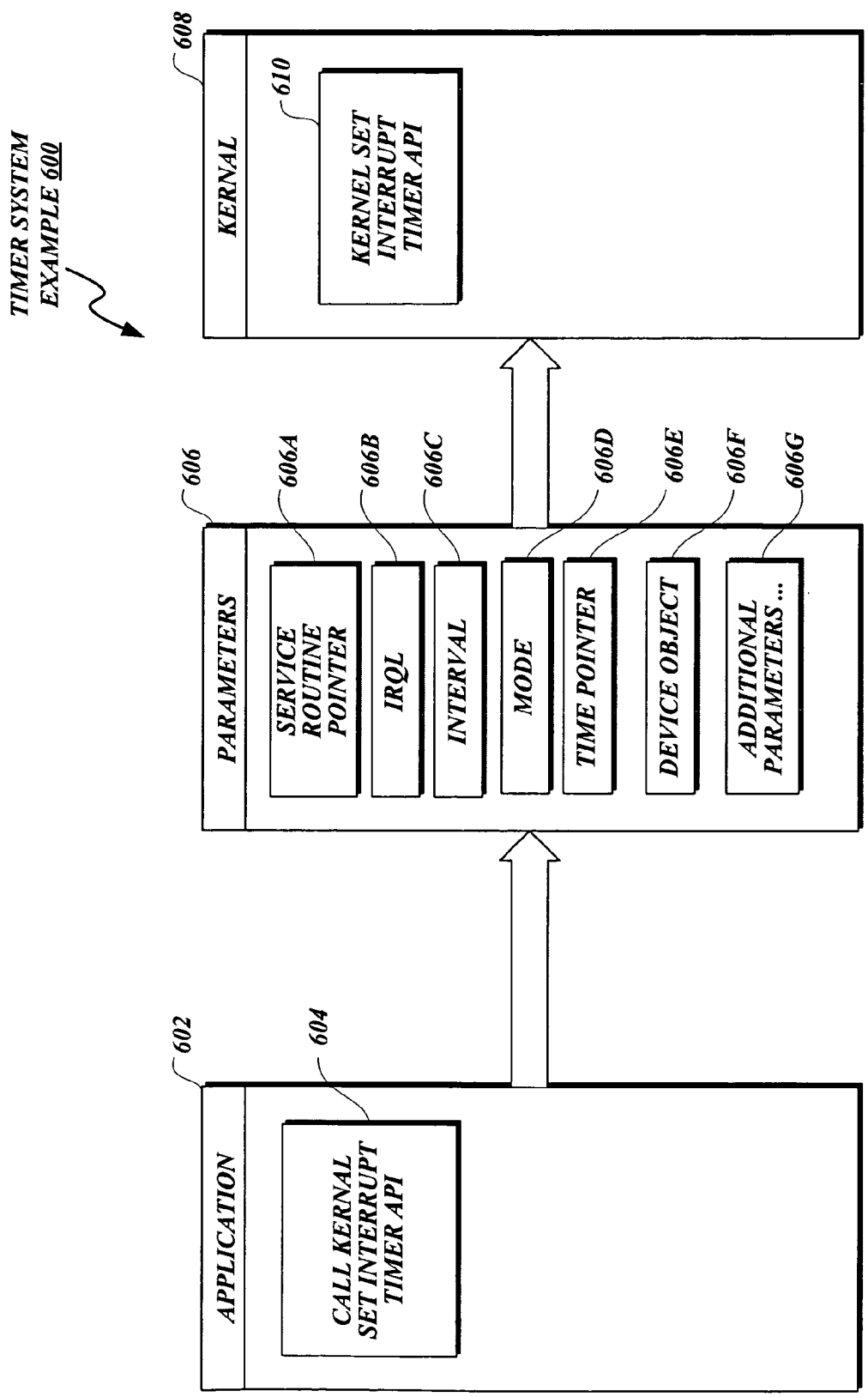
FIG. 6A is a block diagram illustrating certain aspects of a hardware-independent application programming interface for implementing an embodiment of the present invention.
Figure 6B:
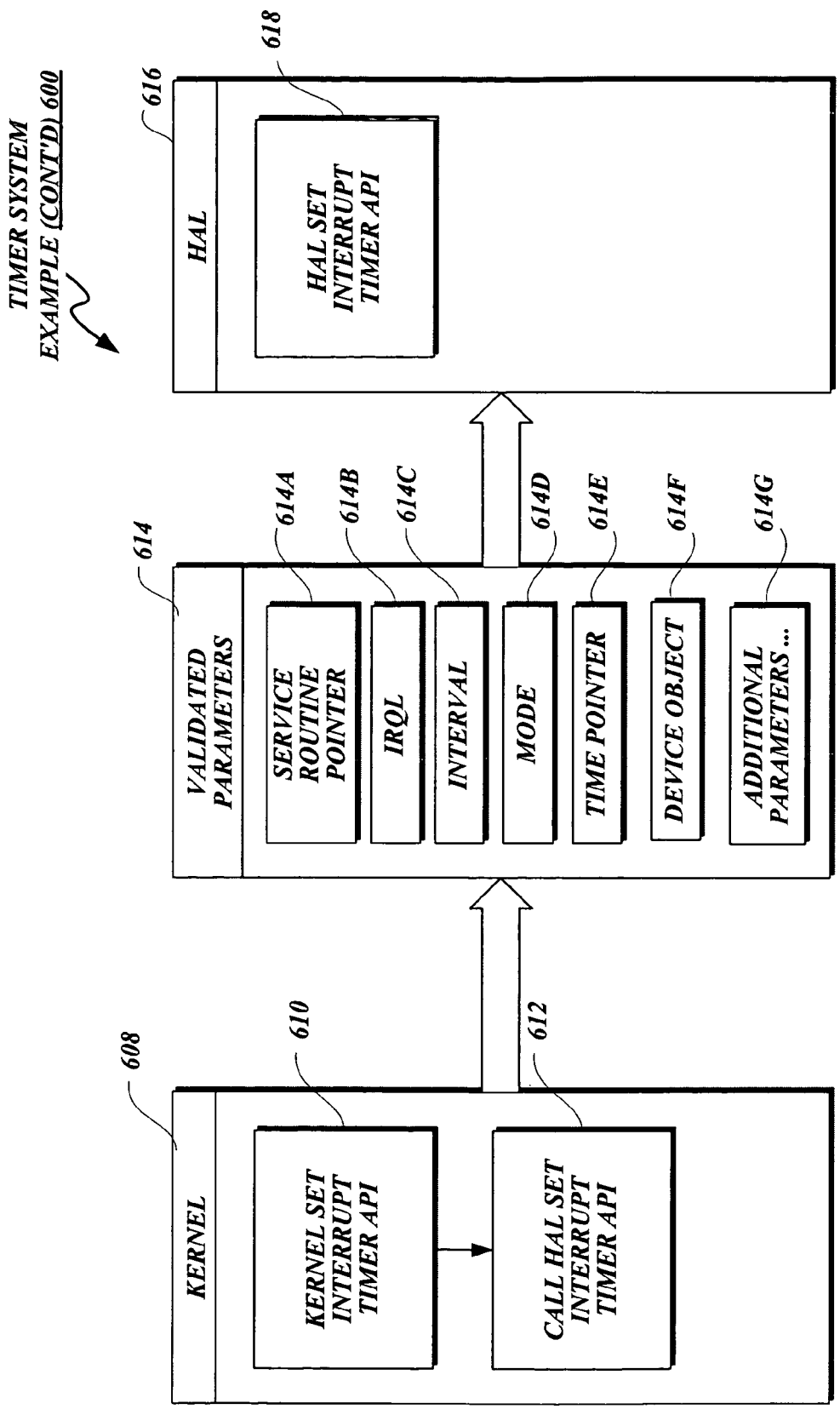
FIG. 6B is a block diagram illustrating certain aspects of a hardware-dependent application programming interface for implementing an embodiment of the present invention.

FIGS. 6A and 6B illustrate further details of an example implementation 600 of a timer system 100. In particular, FIG. 6A is a block diagram illustrating certain aspects of a hardware-independent application programming interface for implementing an embodiment of the present invention. As shown, a calling application 602 contains a call 604 to a kernel mode routine 608 having a set interrupt timer API 610. Passed in the call 604 are one or more parameters 606, including an interrupt service routine pointer 606A that points to an application-provided ISR to be run upon expiration of the timer, an IRQL 606B that specifies the request level at which the application-provided ISR is to operate, an interval 606C, that specifies a unit of time after which the timer should expire, a mode 606D, that specifies whether the timer should operate in periodic or aperiodic mode, a time pointer 606E, that specifies the location in application-managed memory in which the actual time that the timer is set to expire is to be written, and another pointer 606F to application managed memory associated with the interrupt service routine pointer 606A. Other additional parameters 606G may be passed in the call 604 depending on the implementation. For example, in some implementations, the calling application 602 may specify a value representing the set of processors on which device interrupts can occur. As another example, in some implementations, the calling application 602 may specify yet another pointer to an area in application managed memory that represents a service context that will be supplied to the application-provided ISR when executed upon expiration of the timer.

In FIG. 6B, the kernel mode routine 608 having a set interrupt timer API 610 further includes a call 612 to a hardware application layer (HAL) routine 616 having its own set interrupt timer API 618. The HAL set interrupt timer API 618 receives the validated parameters 614 passed by the call 612 from the kernel mode routine. The validated parameters 614 correspond to the parameters 606 passed by the calling application 602, and include an interrupt service routine pointer 614A that points to an application-provided ISR to be run upon expiration of the timer, an IRQL 614B that specifies the request level at which the application-provided ISR is to operate, an interval 614C, that specifies a unit of time after which the timer should expire, a mode 614D, that specifies whether the timer should operate in periodic or aperiodic mode, a time pointer 614E, that specifies the location in application-managed memory in which the actual time that the timer is set to expire is to be written, another pointer 614F to application managed memory associated with the interrupt service routine pointer 614A, and other additional parameters 614G relayed by the call 612.

As noted earlier, there are several scenarios in which the above-described timer system 100 may be particularly useful, including processor power management testing, device simulation, system timer testing, and to quantify the relative load of interrupts currently being serviced at a particular IRQL.

For example, in the processor power management testing scenario, a processor in the relatively light C1 idle state will resume to C0 more quickly than it will from the deeper C2 idle state; likewise for C3 and C4. The deeper the idle state, the more power savings, but the higher the exit latency. Since an interrupt returns the processor to the C0 running state, it may be possible to determine which processor idle state a processor is in based on the relative latency in servicing that interrupt, i.e., the exit latency. To calculate the exit latency, a calling timer application 102A calls the set interrupt timer APIs 610, 618, to the HPET timer to specify an interval to generate an interrupt at time T1, and then queries the HPET timer's up counter at time T2 in the timer application ISR associated with that interrupt. The exit latency equals time T1 subtracted from time T2.

In the device simulation scenario, a device simulator would ordinarily need to usurp all of the capacity of one CPU to successfully simulate a device in a multi-processor system. However, using the functionality of the set interrupt timer APIs 610, 618 to perform periodic processing at a very high resolution at a nearly guaranteed rate allows the simulation to run instead on an UP processor system. An example is the simulation of USB isochronous data transfers used for streaming video and audio. A real USB 2.0 controller is equipped with a processor that polls a shared-memory structure every 125 micro-seconds to check for data that needs to be moved. A calling application simulates the polling of the shared-memory using the set interrupt timer APIs 610, 618 to generate an interrupt and poll the memory at a rate that is very close to the real controller without usurping the processor.

As already discussed, in the system timer testing scenario, testing is difficult in a system operating Microsoft Windows NT, because timers are never guaranteed to expire at a specific time, but rather are guaranteed not to expire before a specific time. Also, there are no APIs to determine which timers are in use on a given system. By using the set interrupt timer APIs 610, 618 to generate a non-shared hardware interrupt to drive an application ISR, the system timer test routines may provide a higher degree of assurance that the timer will expire at the specific time that the calling application intended. This is because hardware interrupts are generally serviced with much less latency than the software deferred procedure calls used in the kernel mode architecture. Furthermore, hardware interrupts are not directly tied to the processing load of a system, allowing more aggressive testing of hardware timers and measuring software latencies.

In the scenario of quantifying the relative load of interrupts currently being serviced at a particular IRQL, the set interrupt timer APIs 610, 618 may be used to observe trends in interrupt latency over long periods of time. Possible consumers for this information include: test tools, stress scenarios, performance calculations, scheduling algorithms, and power state transition algorithms.

The foregoing discussion has been intended to provide a brief, general description of a computing system suitable for implementing various features of the invention. Although described in the general context of a personal computer, those skilled in the art will appreciate that the invention may be practiced with many other computer system configurations. For example, the invention may be practiced with a personal computer operating in a standalone environment, or with multiprocessor systems, minicomputers, mainframe computers, and the like. In addition, those skilled in the art will recognize that the invention may be practiced on other kinds of computing devices including laptop computers, tablet computers, personal digital assistants (PDA), or any device upon which computer software or other digital content is installed.

For the sake of convenience, some of the description of the computing system suitable for implementing various features of the invention included references to the Windows NT operating system. However, those skilled in the art will recognize that those references are only illustrative and do not serve to limit the general application of the invention. For example, the invention may be practiced in the context of other operating systems such as the LINUX or UNIX operating systems.

Certain aspects of the invention have been described in terms of programs executed or accessed by an operating system in conjunction with a personal computer. However, those skilled in the art will recognize that those aspects also may be implemented in combination with various other types of program modules or data structures. Generally, program modules and data structures include routines, subroutines, programs, subprograms, methods, interfaces, processes, procedures, functions, components, schema, etc., that perform particular tasks or implement particular abstract data types.

The embodiments of the invention in which an exclusive property or privilege is claimed are defined as follows:

1. A method for configuring a timer in a computing device, the method comprising:
    receiving a request from an application to set a hardware interrupt timer, the application including:
        (a) a process that causes said request to be sent to a kernel mode routine having a first set interrupt timer application programming interface (API) capable of receiving said request,
        (b) an application managed memory, and
        (c) an application interrupt service routine to be run upon expiration of the hardware interrupt timer, said request including a parameter chosen from the group comprising:
            (i) a mode in which the hardware interrupt timer is requested to operate;
            (ii) an interval;
            (iii) a reference to an area of the application managed memory in which a hardware-dependent process is to store a value representing an actual time at which the hardware interrupt timer has been set to expire in accordance with the validated request, and
            (iv) an interrupt request level at which the application interrupt service routine should execute;
    validating the request in a hardware-independent process, said hardware-independent process comprising the kernel mode routine having the first set interrupt timer API, wherein validating the request includes validating the parameter included in the request and verifying that the application is authorized to set the hardware interrupt timer;
    relaying the validated request to the hardware-dependent process, the hardware-dependent process comprising:
        (a) a timer interrupt service routine containing logic to set an expiration time and the application interrupt service routine, and a second set interrupt timer API corresponding to the first set interrupt timer API;
    setting the hardware interrupt timer in the hardware-dependent process to expire in accordance with the validated request, wherein setting the hardware interrupt timer comprises storing the expiration time in the hardware interrupt timer and storing the expiration time in the area of the application managed memory;
    inserting the application interrupt service routine in the timer interrupt service routine scheduled to execute upon expiration of the timer; and
    returning control to the application when execution of the timer interrupt service routine and the inserted application interrupt service routine is complete.

2. The method of claim 1, wherein the group of parameters also includes arm interval representing a period of time after which the hardware interrupt timer is requested to expire, and wherein validating the request includes determining that the interval is of substantially sufficient duration to set the hardware interrupt timer.

3. The method of claim 1, wherein validating the request includes determining that the mode is one of periodic and aperiodic.

4. The method of claim 1, wherein the group of parameters also includes a parameter that specifies an application interrupt service routine that is to be executed upon expiration of the hardware interrupt timer, and wherein validating the request includes determining that the application interrupt service routine is properly registered.

5. The method of claim 4, wherein the group of parameters also includes a parameter that specifies a device object, and wherein validating the request includes determining that the application service routine corresponds to the device object.

6. The method of claim 4, wherein setting the hardware interrupt timer includes registering a timer service routine to be executed upon expiration of the hardware interrupt timer, the timer service routine being modified to run the application service routine.

7. A system to configure a timer in a computing device, the system comprising:
    a timer substantially guaranteed to expire at a time certain;
    a hardware-independent interface to the timer, wherein the hardware-independent interface is a kernel mode routine having a set interrupt timer application programming interface (API) for receiving parameters associated with a request from the application to set the timer, and validating the request, wherein validating the request includes validating the parameters by the hardware-independent interface;
    a hardware-dependent interface to the timer; and
    a processor in which the hardware-independent interface operates to validate a request from an application to set the timer and to relay the validated request to the hardware-dependent process, and further in which the hardware-dependent interface operates to set the timer to expire in accordance with the validated request and to execute a timer interrupt service routine upon expiration of the timer.

8. The system of claim 7, wherein the timer is a high precision event timer (HPET).

9. The system of claim 8, wherein the hardware-dependent interface operates to set the timer by writing an actual time at which the HPET should expire to a comparator register associated with the HPET, the actual tune being determined by the hardware-dependent interface in accordance with the validated request.

10. The system of claim 7, wherein the parameters specify an interval representing a period of time after which the hardware interrupt timer is requested to expire, and wherein the processor operates to validate the request by determining that the interval is of substantially sufficient duration to set the timer.

11. The system of claim 7, wherein the parameters specify a mode in which the timer is requested to operate, and wherein the processor operates to validate the request by determining that the mode is one of periodic and aperiodic.

12. The system of claim 7, wherein the hardware-dependent interface is a hardware application layer (HAL) routine having an interface to receive the validated parameters associated with the request relayed from the hardware-independent interface.

13. The system of claim 7, wherein the hardware-dependent interface further operates to execute an application service routine upon expiration of the timer.

14. A computer-accessible medium having instructions for setting a timer in a computing device when executed by a processor included in said computing device, the instructions comprising:
   a hardware-independent process to:
      (a) receive a request from an application to set a timer in the computing device, the timer being substantially guaranteed to expire at a time certain; wherein said request contains at least one parameter, the at least one parameter chosen from the group comprising:
         (i) a mode in which the hardware interrupt timer is requested to operate;
         (ii) an interval;
         (iii) a reference to an area of the application managed memory in which a hardware-dependent process is to store-a value representing an actual, time at which the hardware interrupt timer has been set to expire in accordance with the validated request, and
         (iv) an interrupt request level at which the application interrupt service routine should execute;
      (b) determine whether the application is privileged to make the request;
      (c) validate parameters associated with the request; and
   a hardware-dependent process to set the timer to expire in accordance with the validated parameters.

15. The computer-accessible medium of claim 14, wherein the instructions comprising the hardware-dependent process further include instructions to:
   insert an application service routine in a timer service routine scheduled to execute upon expiration of the timer; and
   return control to the application when execution of the timer service routine and inserted application service routine is complete.

* * * * *